United States Patent
Inoue et al.

(10) Patent No.: US 10,462,159 B2
(45) Date of Patent: Oct. 29, 2019

(54) BOTNET DETECTION SYSTEM AND METHOD

(71) Applicant: NTT Innovation Institute, Inc., East Palo Alto, CA (US)

(72) Inventors: Masayuki Inoue, East Palo Alto, CA (US); Satoshi Iitsuka, East Palo Alto, CA (US); Yuhei Kawakoya, East Palo Alto, CA (US)

(73) Assignee: NTT INNOVATION INSTITUTE, INC., East Palo Alto, CA (US)

( * ) Notice: Subject to any disclaimer, the term of this patent is extended or adjusted under 35 U.S.C. 154(b) by 79 days.

(21) Appl. No.: 15/190,093

(22) Filed: Jun. 22, 2016

(65) Prior Publication Data

US 2017/0374084 A1    Dec. 28, 2017

(51) Int. Cl.
*H04L 29/00* (2006.01)
*H04L 29/06* (2006.01)
*C10M 135/36* (2006.01)

(52) U.S. Cl.
CPC ....... *H04L 63/1416* (2013.01); *C10M 135/36* (2013.01); *H04L 63/1425* (2013.01); *H04L 63/1433* (2013.01); *H04L 63/1458* (2013.01); *C10M 2219/104* (2013.01); *C10N 2230/36* (2013.01); *C10N 2240/042* (2013.01); *C10N 2240/10* (2013.01); *C10N 2240/30* (2013.01); *H04L 2463/144* (2013.01)

(58) Field of Classification Search
CPC ........... H04L 2463/144; H04L 63/1416; H04L 63/1425
See application file for complete search history.

(56) References Cited

U.S. PATENT DOCUMENTS

| | | |
|---|---|---|
| 7,610,624 B1 | 10/2009 | Brothers |
| 7,912,698 B2 | 3/2011 | Statnikov et al. |
| 8,135,718 B1 | 3/2012 | Das et al. |
| 8,418,249 B1 | 4/2013 | Nuycci |
| 8,762,298 B1 | 6/2014 | Ranjan |
| 9,680,855 B2 | 6/2017 | Schultz |
| 2002/0052858 A1 | 5/2002 | Goldman et al. |
| 2002/0138492 A1 | 9/2002 | Kil |
| 2004/0128535 A1 | 7/2004 | Cheng |
| 2006/0037080 A1 | 2/2006 | Maloof |

(Continued)

OTHER PUBLICATIONS

Auto-WEKA webpage printed regarding algorithms (2 pages) (Chris Thornton et al.) Feb. 17, 2015.

(Continued)

*Primary Examiner* — Ghazal B Shehni
(74) *Attorney, Agent, or Firm* — DLA Piper LLP (US)

(57) ABSTRACT

A system and method are provided for detecting a botnet in a network based on traffic flow, daisy chained mechanism and white-list generation mechanism. The system and method uses the known malicious components in a botnet such as IP address, domain name and URL, to be the root of a daisy chain and creates a network graph based on given traffic flow data such as NetFlow data, DNS cache data, DNS sinkhole data, DDoS data and Attack log data in threat sensors. The system and method iteratively detects new malicious factors by tracing that network graph. The system and method also introduces a technique to create a white list which is used in the daisy chain to reduce false positive.

16 Claims, 8 Drawing Sheets

(56) References Cited

U.S. PATENT DOCUMENTS

| | | |
|---|---|---|
| 2008/0098479 A1 | 4/2008 | O'Rourke |
| 2008/0148398 A1 | 6/2008 | Mezack |
| 2008/0220740 A1 | 9/2008 | Shatzkamer |
| 2008/0276317 A1 | 11/2008 | Chandola |
| 2008/0279387 A1 | 11/2008 | Gassoway |
| 2008/0294019 A1 | 11/2008 | Tran |
| 2009/0028141 A1 | 1/2009 | Vu Duong et al. |
| 2009/0254992 A1 | 10/2009 | Schultz et al. |
| 2010/0007489 A1 | 1/2010 | Misra et al. |
| 2010/0183211 A1 | 7/2010 | Meetz et al. |
| 2010/0201489 A1 | 8/2010 | Griffin |
| 2011/0179492 A1 | 7/2011 | Markopoulou |
| 2011/0299420 A1 | 12/2011 | Waggener et al. |
| 2012/0167210 A1* | 6/2012 | Oro Garcia ......... H04L 63/1425 726/22 |
| 2013/0111036 A1 | 5/2013 | Ozawa et al. |
| 2013/0247205 A1 | 9/2013 | Schrecker |
| 2014/0122370 A1 | 5/2014 | Jamal et al. |
| 2014/0136846 A1 | 5/2014 | Kitze |
| 2014/0137257 A1 | 5/2014 | Martinez |
| 2014/0189873 A1 | 7/2014 | Elder |
| 2014/0201374 A1 | 7/2014 | Ashwood-Smith |
| 2014/0219096 A1 | 8/2014 | Rabie et al. |
| 2014/0237599 A1 | 8/2014 | Gertner |
| 2014/0259170 A1 | 9/2014 | Amsler |
| 2014/0317261 A1 | 10/2014 | Shatzkamer et al. |
| 2014/0317293 A1 | 10/2014 | Shatzkamer |
| 2014/0325231 A1 | 10/2014 | Hook et al. |
| 2015/0019710 A1 | 1/2015 | Shaashua et al. |
| 2015/0033340 A1 | 1/2015 | Giokas |
| 2015/0074807 A1* | 3/2015 | Turbin ................ H04L 63/1416 726/23 |
| 2015/0082308 A1 | 3/2015 | Kiess et al. |
| 2015/0163242 A1 | 6/2015 | Laidlaw |
| 2015/0227964 A1 | 8/2015 | Yan et al. |
| 2015/0288767 A1 | 10/2015 | Fargano et al. |
| 2015/0317169 A1 | 11/2015 | Sinha et al. |
| 2015/0326535 A1 | 11/2015 | Rao et al. |
| 2015/0333979 A1 | 11/2015 | Schwengler et al. |
| 2015/0381423 A1 | 12/2015 | Xiang |
| 2015/0381649 A1 | 12/2015 | Schultz |
| 2016/0006642 A1 | 1/2016 | Chang et al. |
| 2016/0050161 A1 | 2/2016 | Da et al. |
| 2016/0057234 A1 | 2/2016 | Parikh et al. |
| 2016/0154960 A1 | 6/2016 | Sharma et al. |
| 2016/0205106 A1 | 7/2016 | Yacoub et al. |
| 2016/0248805 A1 | 8/2016 | Burns et al. |
| 2016/0301704 A1 | 10/2016 | Hassanzadeh |
| 2016/0301709 A1 | 10/2016 | Hassanzadeh |
| 2016/0364553 A1 | 12/2016 | Smith |
| 2017/0149804 A1* | 5/2017 | Kolbitsch ........... H04L 63/1416 |

OTHER PUBLICATIONS

Ayat, N.E.; Cheriet, M.; Suen, C.Y.; "Automatic Model Selection for the optimization of SVM Kernels," Mar. 21, 2005 (35 pages).

Brodley, Carla E., "Addressing the Selective Superiority Problem: Automatic Algorithm/Model Class Selection," (1993) (8 pages).

Chapelle, Olivier; Vapnik, Vladimir; Bousquet, Olivier; Mukherjee, Sayan; "Choosing Multiple Parameters for Support Vector Machines," *Machine Learning*, 46, 131-159, 2002 © 2002 Kluwer Academic Publishers (29 pages).

Lee, Jen-Hao and Lin, Chih-Jen, "Automatic Model Selection for Support Vector Machines, pp. 1-16" (2000).

Smith, Michael R.; Mitchell, Logan; Giraud-Carrier, Christophe; Martinez, Tony; "Recommending Learning Algorithms and Their Associated Hyperparameters," Jul. 7, 2014 (2 pages).

Thornton, Chris. Thesis: "Auto-WEKA: Combined Selection and Hyperparameter Optimization of Supervised Maching Learning Algorithms," Submitted to the University of British Columbia, Mar. 2014 (75 pages).

Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).

Wolinski, Christophe; Kuchcinski, Krzysztof. "Automatic Selection of Application-Specific Reconfigurable Processor Extensions." *Design, Automation & Test in Europe Conference* (Date '08), Mar. 2008, Munich, Germany, pp. 1214-1219 (7 pages).

Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).

H. Larochelle et al. "An empirical evaluation of deep architectures on problems with many factors of variation" ACM ICML '07, pp. 473-480 (8 pgs).

J. Bergstra et al. "Random Search for Hyper-Parameter Optimization" Journal of Machine Learning Research 13 (2012), p. 281-305 (25 pgs).

Boyen-X, et al.,—Identity-Based Cryptography Standard (IBCS) #1: Supersingular Curve Implementations of the BF and BB1 Cryptosystems, dated Dec. 2007—WEBPAGE https://tools.ietf.org/html/rfc5091 (64 pgs.).

Stouffer, K. et al.,—"The National Institute of Standards & Technology(NIST) Industrial Control System (ICS) security guide" dated May 2015 (247 pgs.).

Chih-Fong, T. et al., Intrusion Detection by Machine Learning: A Review: dated 2009; pp. 11994-12000 (11 pgs.).

\* cited by examiner

BOTNET DETECTION SYSTEM AND METHOD

FIELD

The disclosure relates generally to a method and system for detecting botnets.

BACKGROUND

Blacklists are well known and generally act as an access list to a computer network. Thus, email addresses, users, passwords, URLs, IP addresses, domain names, file hashes, etc can be on a blacklist for a particular company and will not be allowed to access over the computer network of the company. Many commercial anti-virus products may include a blacklist.

Network traffic flow analysis of computer network is also well known. Traffic flow analysis is the analysis of the flow of digital data as it travels from one node (a source address) to another node (a destination address.) Network traffic flow here includes NetFlow, DNS cache, DNS sync hole traffic flow, etc. These analysis has been used to detect malware and the like.

Botnets are also known and consist of a plurality of computer systems that are working in a coordinated manner. Botnets can exist for legal purposes, but are often use for nefarious purposes in which each computer resource of the botnet may be infected with malicious code.

None of the existing malware and virus detection systems use both blacklists and Network traffic flow analysis data to recursively detect botnets.

DETAILED DESCRIPTION OF ONE OR MORE EMBODIMENTS

The disclosure is particularly applicable to a malware detection system that incorporates the network traffic flow botnet detection and method and it is in this context that the disclosure will be described. It will be appreciated, however, that the system and method has greater utility since the network traffic flow botnet detection and method may receive the network traffic flow data from other sources and may operate as a stand-alone system.

Figure 1:
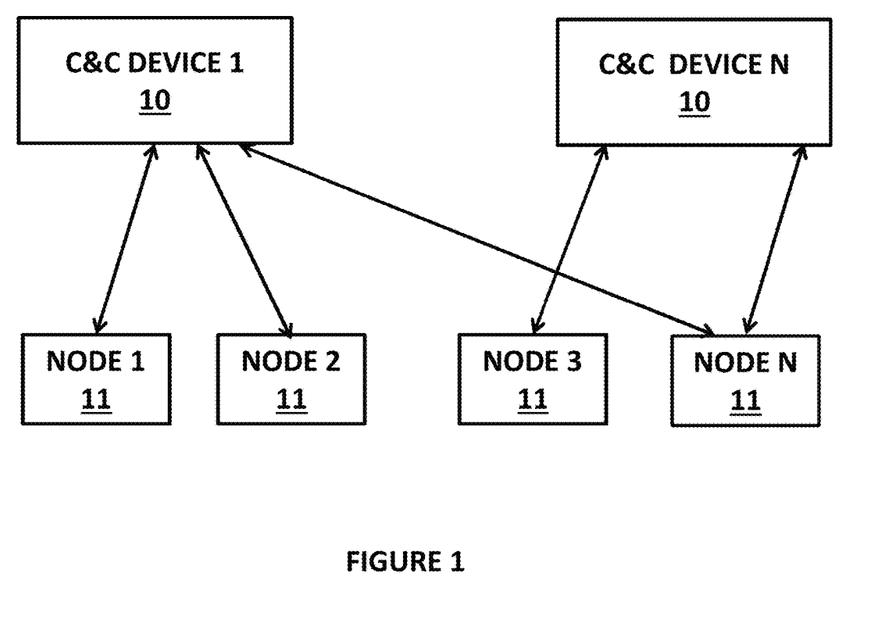
FIG. 1 illustrates an example of a network with one or more nodes and one or more command and control (C&C) devices in which a botnet may be detected.

FIG. 1 illustrates an example of a network with one or more nodes 11 and one or more command and control (C&C) devices 10 in which a botnet may be detected using a botnet detection system and method described below. The network may be the one or more nodes 11, such as node 1, . . . , node N as shown in FIG. 1, that may communicate with the one or more C&C devices 10, such as C&C device 1, . . . , C&C device N as shown in FIG. 1, as shown by the arrows in the example in FIG. 1. Each C&C device 10 and each node 11 may have an internet protocol (IP) address. When a particular node 11 with a particular IP address communicates with a particular C&C device 10 with its own particular IP address, a network traffic flow data structure is created indicating that the node and the C&C device have communicated with each other. The network traffic flow data structure may have a source IP address (src_ip) and a destination IP address (dest_ip). The source IP address may be the IP address for the particular node or the particular C&C device while the destination IP address may be the IP address for the particular C&C device (when the source IP address is the IP address for the particular node) or the IP address for the particular node (when the source IP address is the IP address for the particular C&C device.) Each of the C&C device 10 and the node 11 may be a computer system such as a personal computer, laptop computer, tablet computer, smartphone device and the like that has the ability to communicate over the network.

In the network shown in FIG. 1, it is desirable to detect a botnet as described below. The one or more nodes 11 shown in FIG. 1 each may be referred to as a victim node, a zombie node and/or a non-zombie node. A victim node is a node in the network that is being victimized by the botnet. A botnet is a number of Internet-connected computers communicating with other similar machines in which components located on networked computers communicate and coordinate their actions by command and control (C&C) or by passing messages to one another. Botnets have been used many times to send spam email or participate in distributed denial-of-service attacks. In other words, a botnet is a network that consists of C&C devices 10 and/or infected nodes 11 (zombie nodes).

Each C&C device 10 may include command and control (C&C) infrastructure consisting of servers and other technical infrastructure used to control malware in general, and, in particular, botnets. Command and control devices 10 may be either directly controlled by the malware operators, or themselves run on hardware compromised by malware.

A zombie node may be a computer connected to the Internet that has been compromised by a hacker, computer virus or trojan horse and can be used to perform malicious tasks of one sort or another under remote direction. Botnets of zombie computers are often used to spread e-mail spam and launch denial-of-service attacks. Most owners of zombie computers are unaware that their system is being used in this way. Because the owner tends to be unaware, these computers are metaphorically compared to zombies. A coordinated DDoS attack by multiple botnet machines also resembles a zombie horde attack. A non-zombie node is a node that is not a zombie node that thus not comprised by the hacker, computer virus or trojan horse.

Figure 2:
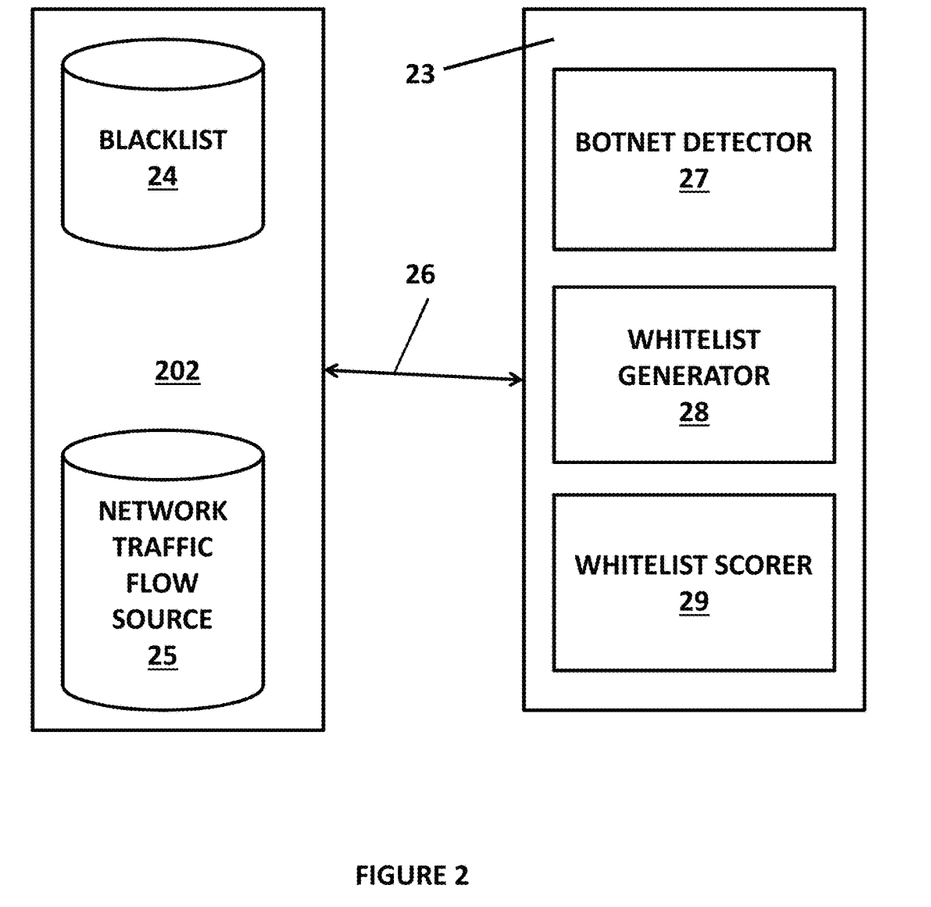
FIG. 2 illustrates an example of a system for botnet detection that may detect a botnet in the network shown in FIG. 1.

FIG. 2 illustrates an example of a system for botnet detection that may detect a botnet in the network shown in FIG. 1. The system may have a storage device 202 that may store various data that may be used by the system to detect a botnet. In particular, inputs to the system may include blacklist 24 as well as network traffic flow source 25. The inputs to the system may be obtained by a botnet detection system 23, such as over a communication link 26 or the input data to the system may be stored locally on the botnet detection system 23 resources. The storage device 202 may be hardware based storage or software based storage. The storage device may be implemented using a database server, a hard disk drive, flash drive and the like. The system may have other storage devices that store the various other data used by/in the system including the plurality of lines of computer code when the various elements shown in FIG. 2 are software implemented, various network traffic flow data (including the IP addresses that are to be monitored), any rules generated by the user and the like.

The botnet detection system 23 may be implemented in hardware and/or software. The botnet detection system 23 may include a botnet detector 27, a white-list generator 28 and a white-list scorer 29. Each of these elements 27-29 may be implemented using hardware or software. When each element is implemented in hardware, it may be an FPGA, programmed microcontroller, microprocessor, state machine and the like and may perform the operations and functions described below with reference to FIGS. 3-7. When each element is implemented in software, it may include a plurality of lines of computer code that may be stored in a memory and executed by a processor of a computing resource on which the element is hosted to perform the operations and functions described below with reference to FIGS. 3-7. The computing resource may be, for example, a server computer, an application server, a blade server, a computer system, a laptop computer, a tablet computer, etc. The botnet detector 27 may perform the botnet detection process described below with reference to FIGS. 4A-4B, the white-list generator 28 may perform the white-list generating method described below with reference to FIG. 5 and the white-list scorer 29 may perform the white-list scoring process described below with reference to FIGS. 6-7.

As described in more detail below, the botnet detection system 23 may receive network traffic flow data such as netflow data, DNS data, etc as described below (including IP addresses for known botnets) and is able to detect botnet and a malicious IP address as detailed below in FIGS. 3-7. The network traffic flow data may be generated from one or more network components such as the one or more C&C devices 10 and the one or more nodes 11 that may be possible botnet nodes.

Figure 3:
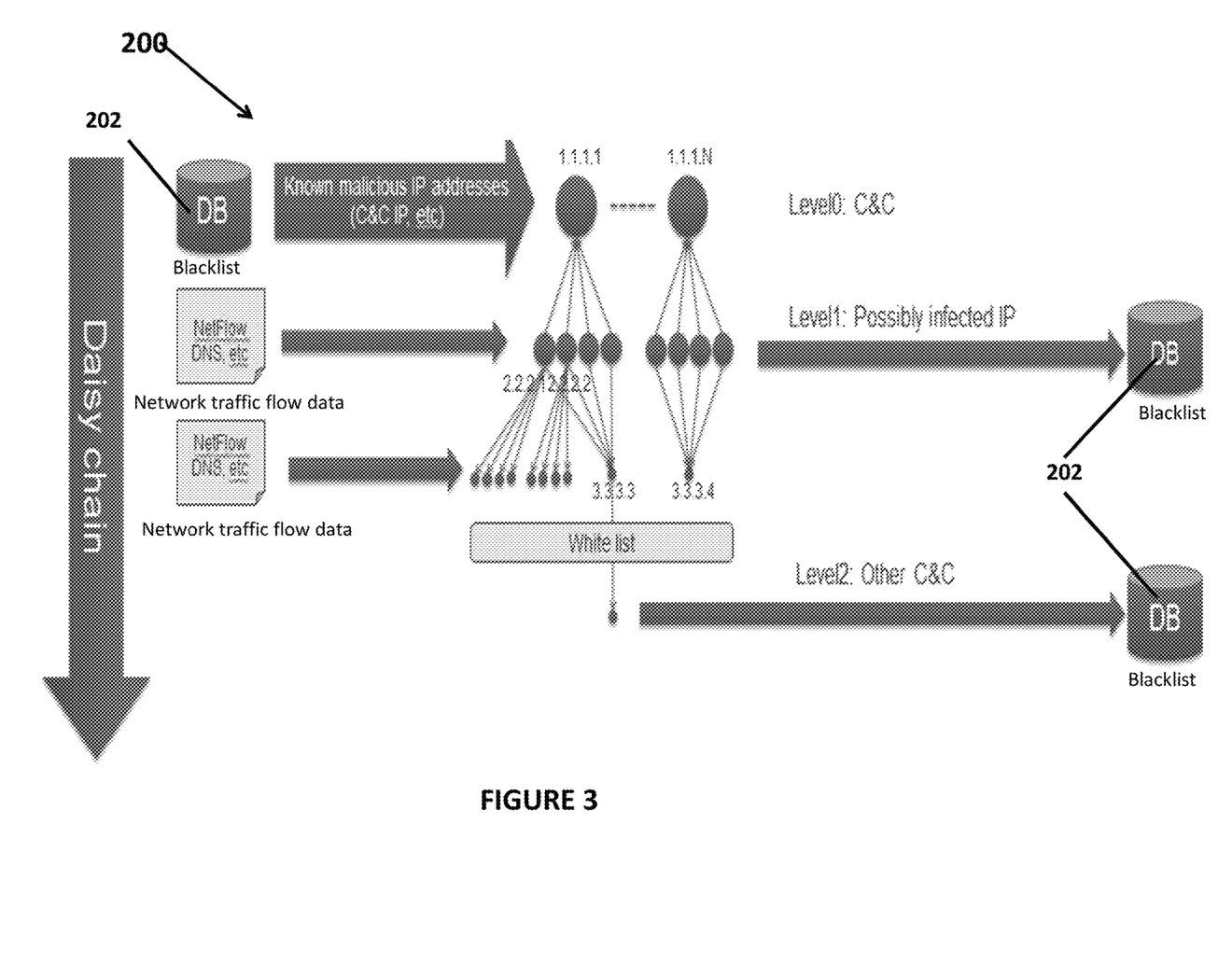
FIG. 3 illustrates a daisy chain method for determining malicious IP addresses.

FIG. 3 illustrates a daisy chain method 200 for determining malicious IP addresses and thus a botnet. In one embodiment, the method 200 may be performed by the botnet detection system 23 shown in FIG. 2. The method may operate on a plurality of IP addresses (input and output IP addresses) that may be stored in a storage device 202 that may also store a blacklist of known malicious IP addresses. In one embodiment, the storage device may be, for example, a software or hardware implemented database as shown in FIG. 3. In the method, previously unknown malicious IP addresses may be detected by matching network traffic flow data, such as Netflow or domain name service ("DNS") cache, with known malicious IP addresses from the blacklist. Each piece of netflow and DNS data may be a pair of a source IP address (a from address) and a destination IP (a to address). In one embodiment, the method may be daisy chained since the malicious IP address discovered by the method may be stored in the storage device 202 and then used as one of the known malicious IP addresses during a next iteration of the method as described below in more detail with reference to FIGS. 4A and 4B.

Thus, as shown in FIG. 3, one or more known malicious IP addresses of C&C devices 10, such as 1.1.1.1 . . . 1.1.1.N from the store 202 (Level 0) may be matched against Netflow and DNS data as shown and possibly infected IP addresses may be identified and stored in the store 202 (Level 1). The method then matches the next level of the IP address against Netflow and DNS data as shown and compares that IP addresses against a white list (a list of IP URLs, IP addresses, domain names and such that may be accessed by the computer network user) and stores other C&C IP addresses in the store 202 (Level 2). Further details of the process in FIG. 3 are described with reference to FIGS. 4A and 4B.

Figure 4A:
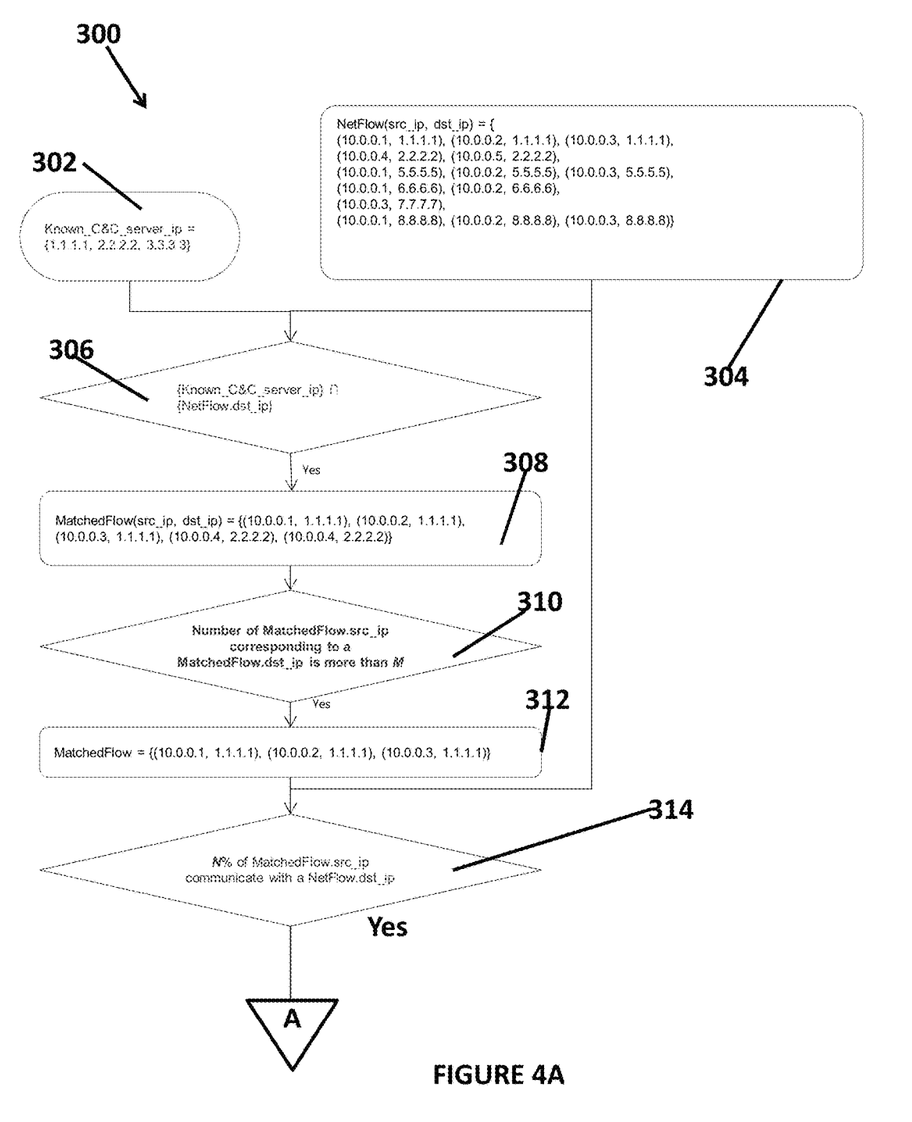
FIGS. 4A and 4B illustrate an example of a method for determining malicious IP addresses.
Figure 4B:
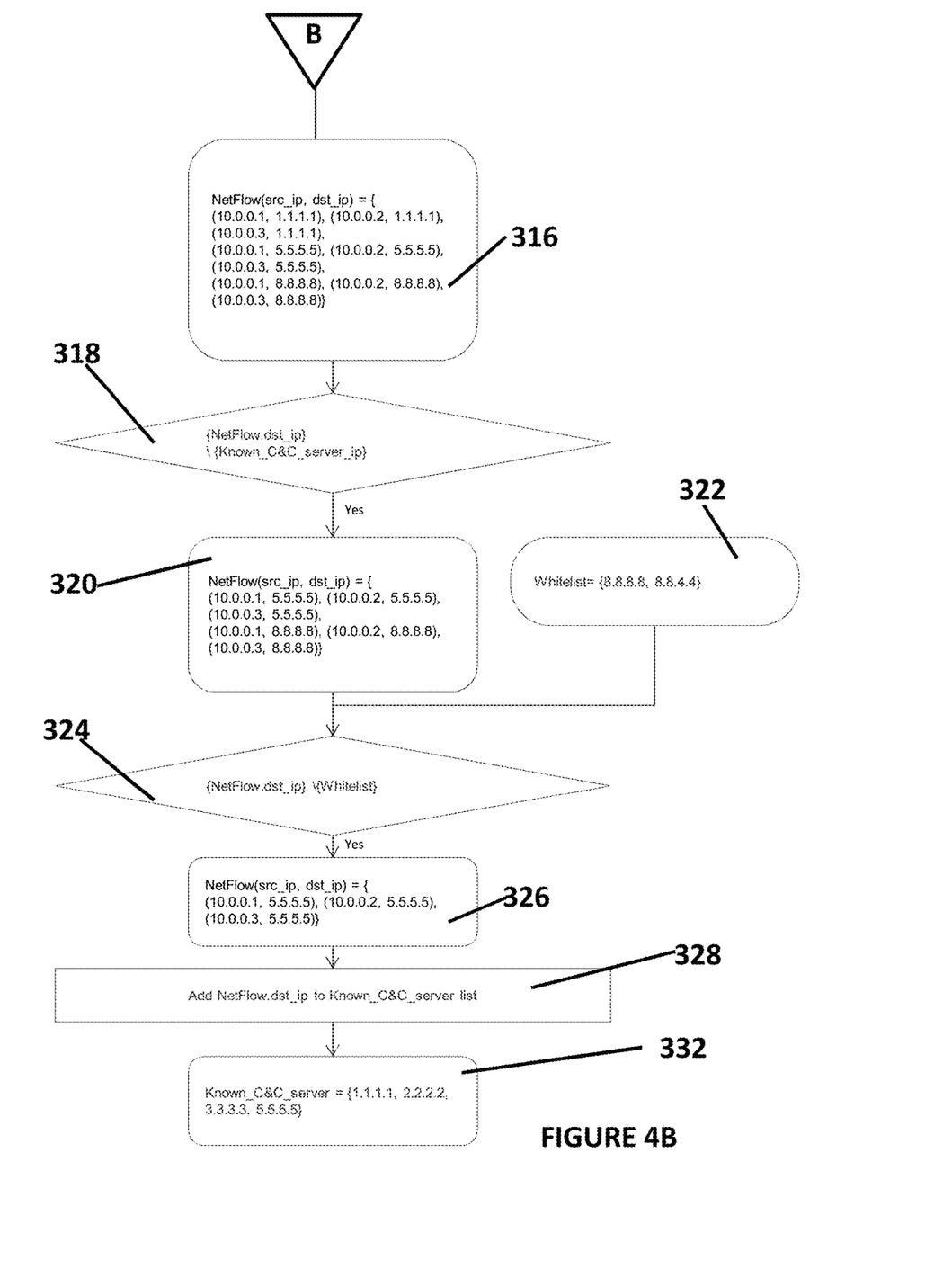

FIGS. 4A and 4B illustrate an example of a method 300 for determining malicious IP addresses. In one embodiment, the method 300 may be executed by the botnet detection system 23 and/or the botnet detector 27 of FIG. 2, but may also be implemented using other hardware or hardware and software configurations. The method receives a known malicious C&C server IP address 302 (such as 1.1.1.1, 2.2.2.2, 3.3.3.3 as shown) and a set of netflow and DNS data 304 such as the various IP addresses shown in FIG. 4A. Each Netflow and DNS piece of data may include a source IP address ("src_ip" such as 10.0.0.2, 8.8.8.8) and a destination IP address ("dst_ip" such as 10.0.0.3, 8.8.8.8) so that the example in FIG. 3A shows seven Netflow and DNS pieces of data. The method may thus use network traffic flow data generated by known botnets to detect new botnets. The network traffic flow data may include NetFlow data, DNS cache data, DNS sinkhole traffic, DDoS traffic and/or an attack log in sensors that are used to create the network traffic flow. DNS sinkhole are domain names which are used to be used by botnets and are took over by legitimate organization such as low enforcement. By monitoring network traffic to or from the DNS sinkhole domains, it is possible to collect botnet network traffic flow. DDoS stands for Distributed Denial of Services which tries to stop a service on a target host by sending many malicious traffic from many nodes. Those traffic are typically generated by zombie hosts in botnets. Attack log in sensors are log generated by security sensors such as firewall, intrusion detection system (IDS) and honeypots The method may then performs a union operation (∩ as shown in FIG. 4A) 306 to compare/match the known address with each of the NetFlow destination IP addresses. The match process identifies any NetFlow that match the known address and stores those matching addresses in a MatchedFlow data structure 308. In the example in FIG. 4A, various IP addresses, such as 10.0.0.1, 1.1.1.1 and 10.0.0.4, 2.2.2.2 for example, match the known IP address. The method considers the MatchedFlow as malicious activity. The detection mechanism in the example in FIG. 4A is matching C&C server IP with NetFlow.dst_ip. Other factor such as timing (duration) of the communication, packet size, TCP/UDP port number can also be used as signatures to detect the malicious activity. This process corresponds to the Level 1 matching shown in FIG. 3.

The method may then determine if the number of MatchedFlow.src_ip corresponding to a MatchedFlow.dst_ip is more than a predetermined number M (310). M is a threshold which indicates a number of victim nodes communicating with a command and control ("C&C") server. The value of M is 3 in this example shown in FIG. 4A. If the number of MatchedFlow.src_ip is more than a predetermined number M, a MatchedFlow data structure with a predetermined number of the IP addresses (312) is generated. The method may then determine if a predetermined percentage, such as N %, of the MatchedFlow.src_ip communicates with a NetFlow.dst_ip address (314). In one example, N may be 80. The range of percentages may be preferably between 80% to 90% based on the traffic pattern is some real botnets. However, the predetermined percentage may also be adjusted based on the type of botnet. If the predetermined percentage is met, a set of NetFlow data is received (316) by the method as shown in FIG. 4B. Each piece of NetFlow data again has both a source address src_ip and a destination address dst_ip. The received NetFlow data may be victim nodes and its NetFlow including known C&C devices.

The method may then match each netflow destination IP address to the known C&C server IP address (318) to generate a set difference between the each netflow destination IP address and the known C&C server IP address. The method may then identify the matching netflow IP addresses (320) as shown in FIG. 34 each of which may be a victim node and its netflow excluding the known C&C server. The method may then receive a white-list (322) of known safe IP addresses, such as 8.8.8.8, 8.8.4.4 and matches/compares the destination IP addresses of the identified netflow data to the white-list (324) and determines the set difference. In some embodiments, the white-list may be generated and/or scored using the process/method shown in FIGS. 5-7, but the white-list may be generated in other ways that are within the scope of the disclosure. In other embodiments, the white-list may be a simply famous web site IP address, such as the IP address used for Alexa top 100 web sites. In an alternative embodiment, the method may create a white-list (described in more detail below in FIG. 5) by taking a look at the total number of hosts which communicates with destination IP addresses as disclosed below. In yet another alternative embodiment, the method may create a white-list and/or score by taking a look at the ratio of zombie hosts and non-zombie hosts (described in more detail below in FIGS. 6-7).

The method may then generate a list of NetFlow IP addresses that does not match the white-list (326) which are new C&C server IP addresses in this example 5.5.5.5 that those IP addresses may correspond to the Level 2 IP addresses shown in FIG. 3. The method may then add that the new C&C server as a known C&C server IP address (328). The method may then identify one or more known C&C server addresses (332) which are stored in the store 202. As described above, the method may then loop back to the start and again perform the same processes in a daisy chain manner. Alternatively, the method may start over with the newly detected {Known_C&C_server} and new {NetFlow} and repeat the process so that the Known_C&C_server list will automatically grow in this manner.

Figure 5:
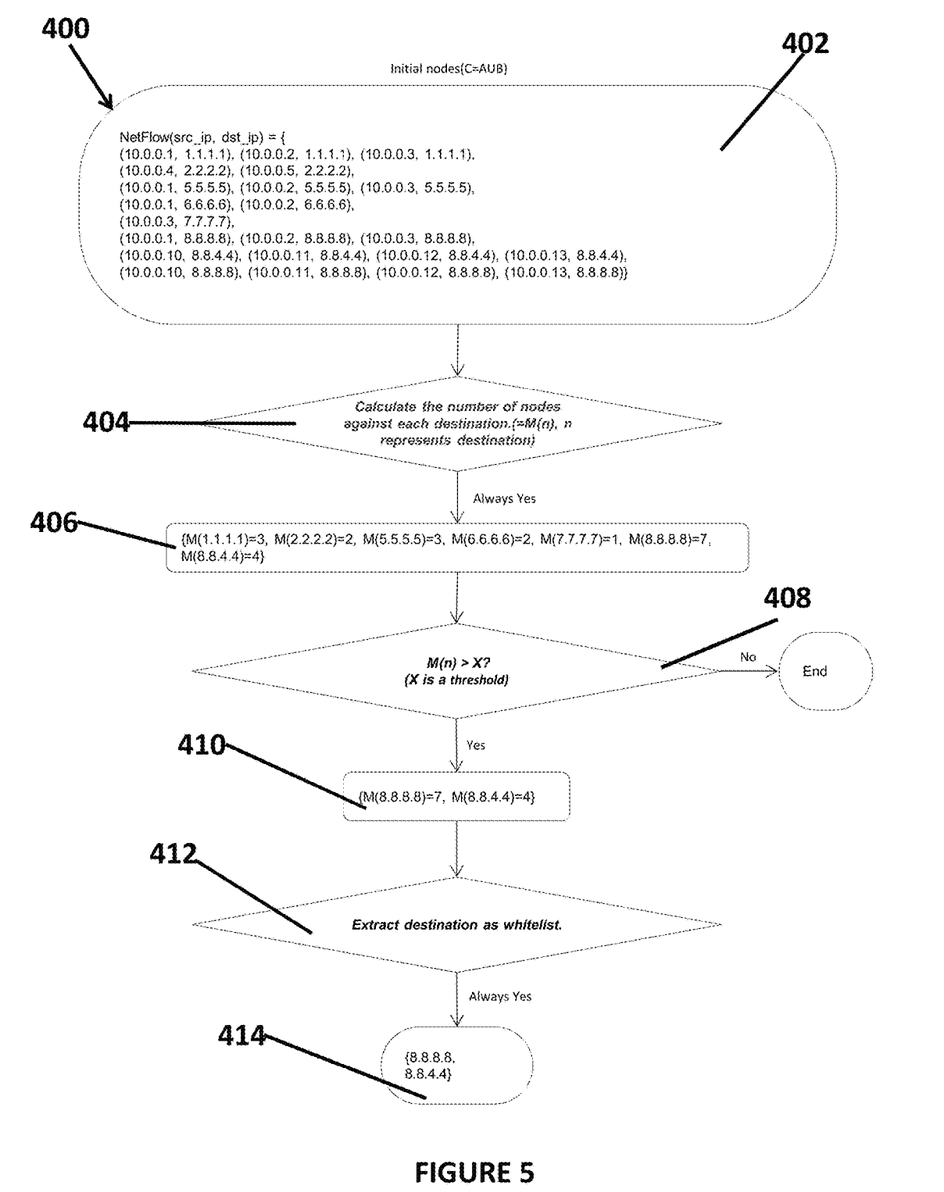
FIG. 5 illustrates an example of a white list generation method of the netflow detection component.

FIG. 5 illustrates an example of a white list generation method 400 of the netflow detection component. For the purposes of an example for the white list generation method, it is assumed that the number of victim nodes (set A) which generate the NetFlow packets to the known C&C devices are much less than benign nodes (set B) so that |A|<<|B| (for example, |A|=100, |B|=1,000,000). The method shown in FIG. 5 may be executed by the botnet detection system 23 and/or the white-list generator 28 in FIG. 2, but may also be implemented using other hardware or hardware and software configurations.

The method may begin with an initial set of nodes C=A∪B. The method may receive a set of NetFlow data (402) wherein each piece of NetFlow data includes a source IP address src_ip and a destination IP address dst_ip as shown in FIG. 5. The method, using the netflow data, may calculate a number of nodes against each destination (=M(n) where n represents the destination IP address) (404). The method may then generate a list of number of occurrences of the destination IP addresses (406), such as M(5.5.5.5)=3 or M(8.8.8.8)=7 in this example. The method may then determine if M(n)>X (408) where X is a predetermined threshold value, such as four in this example. Specifically, a destination address becomes part of the white-list because X may be a very large number, such as 100,000 per minute, that only a very famous internet service, such as Facebook, can reach. Thus, this portion of the method filters out benign famous sites (by putting them on the white-list) for further filtering. The method may generate a list of destination IP addresses that satisfy the threshold (410). The method may then extract destination IP addresses as a white-list (412, 414) as shown in the example.

Figure 6:
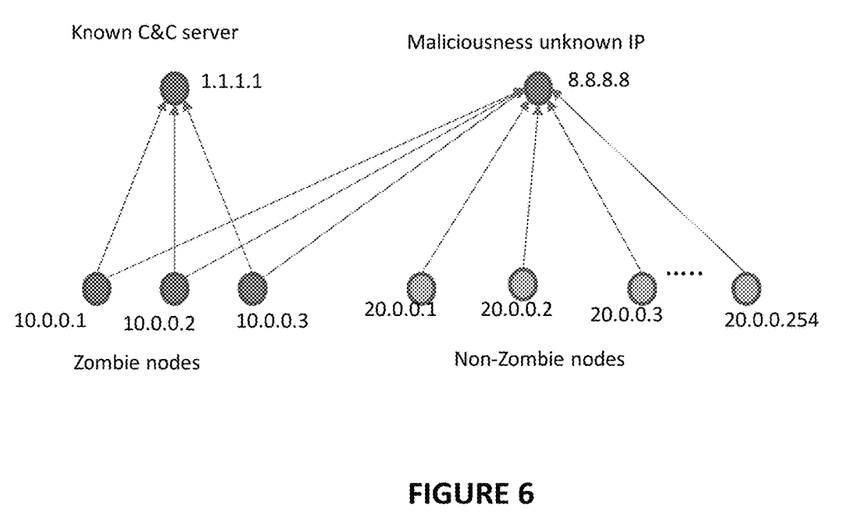
FIG. 6 illustrates an example of zombie nodes and non-zombie nodes.

FIG. 6 illustrates an example of zombie nodes and non-zombie nodes communication. In the botnet method, if zombie nodes communicate with an IP address other than known C&C server, the method regards that IP address as a maliciousness unknown IP (possibly malicious IP) address as shown in FIG. 6. Specifically, since known zombie nodes (10.0.0.1, etc in FIG. 6) communicate with an IP address (8.8.8.8 in the example shown on FIG. 6), that IP address is defined as a maliciousness unknown IP address even if non-zombie nodes also communicate with that IP address as shown in FIG. 6. The mechanism to determine if 8.8.8.8 is malicious IP is written in FIG. 7.

Figure 7:
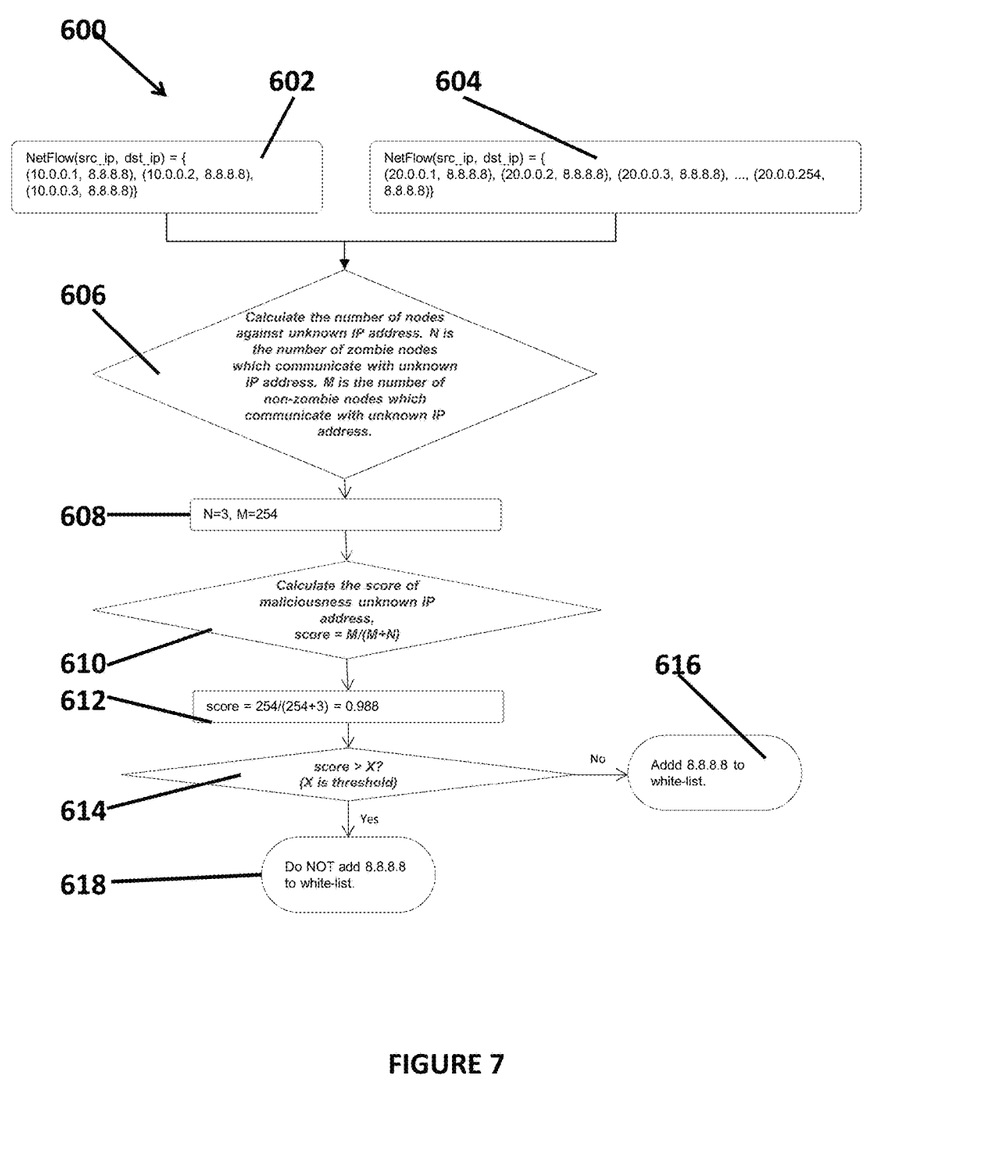
FIG. 7 illustrates a method for white list score generation.

FIG. 7 illustrates a method 600 for white list score generation example. The method shown in FIG. 7 may be executed by the botnet detection system 23 and/or the white-list scorer 29 in FIG. 1, but may also be implemented using other hardware or hardware and software configurations. The method may receive NetFlow data (602, 604) for each zombie node IP address (as the source IP address in the NetFlow data) and the maliciousness unknown IP (8.8.8.8 in this example) address (as the destination IP address in each piece of NetFlow data) (602) and each non-zombie node IP address (as the source IP address in the netflow data) and the maliciousness unknown IP address (as the destination IP address in each piece of netflow data.) (604) Using the received NetFlow data, the method may calculate the number of nodes against the unknown IP address (606) wherein N is the number of zombie nodes which communicate with the unknown IP address (8.8.8.8 in this example) and M is the number of non-zombie nodes which communicate with unknown IP address (8.8.8.8 in this example). In the example in FIG. 6, the method may determine that N=3 and M=254 (608).

Once the numbers of zombie nodes and non-zombie nodes are calculated, the method may calculate a score of maliciousness unknown IP address, wherein the score may be equal to, in one embodiment, score=1−M/(M+N) (610). In the example in FIG. 6, the score may be calculated to be 0.988 (612). The method may then determine if the score is greater than a predetermined number X wherein X is a threshold indicating a likelihood that the unknown IP address is a malicious IP address (614). In various embodiments, X may have a value between 0.95 and 1. If the score exceeds the threshold value, the unknown IP address is added to the white-list (616) whereas if the score does exceed the threshold, then the unknown IP address is not added to the white-list (618) indicating that the known IP address is a malicious IP address.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A botnet detection system, comprising:
a network having one or more nodes and one or more command and control devices coupled to each other;
a storage device having a plurality of pieces of data about the network including a plurality of internet protocol addresses with each internet protocol address corresponding to one of a node, a command and control devices and at least one known botnet and network traffic flow data indicating a communication between one of at least one node and at least one command and a communication and at least one known botnet and a domain name service cache; and
a botnet detection component coupled to the storage device, the botnet detection component detecting a new botnet by matching the network traffic flow data against an IP address of the at least one known botnet.

2. The system of claim 1, wherein the network traffic flow data further comprises NetFlow data, DNS cache data, DNS sinkhole traffic, DDoS traffic and an attack log in sensors.

3. The system of claim 1, wherein the botnet detection component stores data about the detected new botnet, the data including an internet protocol address of the detected new botnet, a domain name of the detected new botnet and a uniform resource locator of the detected new botnet.

4. The system of claim 3, wherein the botnet detection component iteratively detects one or more additional new botnets based on the stored data about the detected new botnet.

5. The system of claim 1, wherein the botnet detection component detects the new botnet by comparing the network traffic data against a white-list.

6. The system of claim 5, wherein the white-list is a famous white-list.

7. The system of claim 5 further comprising a whitelist generator component that generates the whitelist based on a total number of nodes that communicate with a destination internet protocol address.

8. The system of claim 5 further comprising a whitelist scoring component that generates the white-list based on a ratio of the zombie nodes and non-zombie nodes that communicate with an unknown internet protocol address.

9. A botnet detection method, the method comprising:
obtaining a plurality of pieces of data about a network having one or more nodes and one or more command and control devices, the plurality of pieces of data comprising a plurality of internet protocol addresses with each internet protocol address corresponding to one of a node, a command and control devices and at least one known botnet and network traffic flow data indicating a communication between one of at least one node and at least one command and a communication and at least one known botnet and a domain name service cache; and
detecting, using the network traffic flow data, a new botnet by matching the network traffic flow data against an IP address of the at least one known botnet.

10. The method of claim 9, wherein the network traffic pattern data further comprises netflow data, DNS cache data, DNS sinkhole traffic, DDoS traffic and an attack log in sensors.

11. The method of claim 9 further comprising storing data about the detected new botnet, the data including an internet protocol address of the detected new botnet, a domain name of the detected new botnet and a uniform resource locator of the detected new botnet.

12. The method of claim 11 further comprising iteratively detecting one or more additional new botnets based on the stored data about the detected new botnet.

13. The method of claim 9, wherein detecting the new botnet further comprises comparing the network traffic data against a white-list.

14. The method of claim 13, wherein the white-list is a famous white-list.

15. The method of claim 13 further comprising creating the white-list based on a total number of nodes that communicate with a destination internet protocol address.

16. The method of claim 13 further comprising creating the white-list based on a ratio of the zombie nodes and non-zombie nodes that communicate with an unknown internet protocol address.

* * * * *